Oct. 9, 1934.               H. FORD                1,975,836
AUTOMOBILE CONSTRUCTION
Filed Oct. 27, 1931          3 Sheets-Sheet 1

INVENTOR.
Henry Ford.
BY
ATTORNEY.

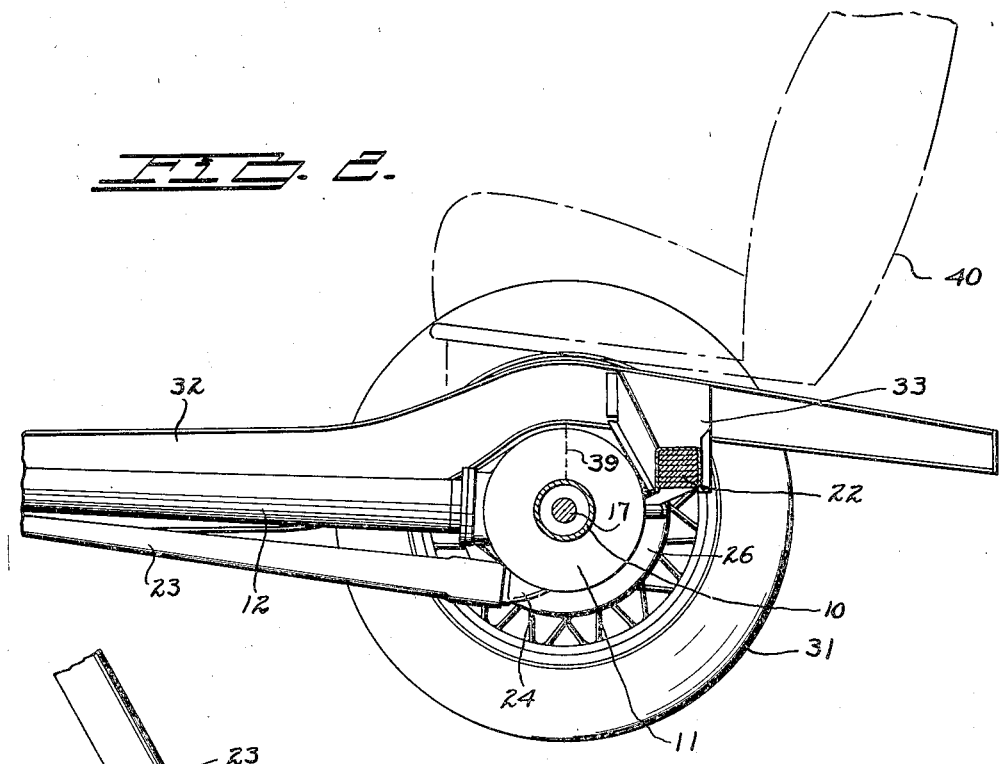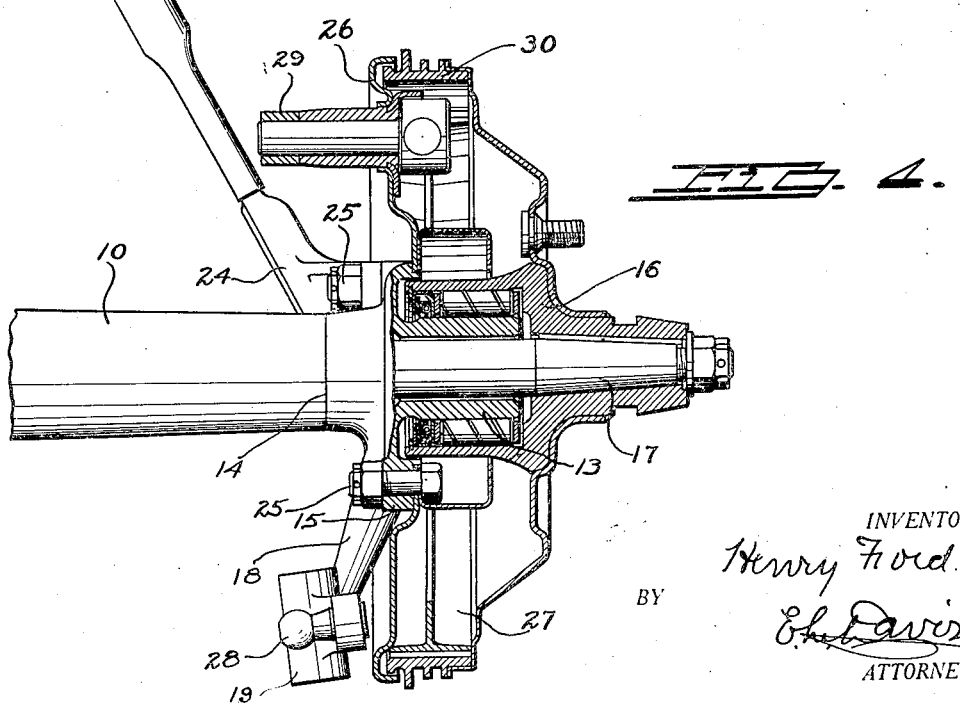

Oct. 9, 1934.    H. FORD    1,975,836
AUTOMOBILE CONSTRUCTION
Filed Oct. 27, 1931    3 Sheets-Sheet 3

INVENTOR.
Henry Ford.
BY
E. L. Davis
ATTORNEY.

Patented Oct. 9, 1934

1,975,836

UNITED STATES PATENT OFFICE 1,975,836

AUTOMOBILE CONSTRUCTION

Henry Ford, Dearborn, Mich., assignor to Ford Motor Company, Dearborn, Mich., a corporation of Delaware Application October 27, 1931, Serial No. 571,352

2 Claims. (Cl. 280—106.5)

The object of my invention is to provide an automobile chassis of simple, durable and inexpensive construction.

A further object of my invention is to provide a chassis having a transverse spring supporting the rear end thereof, which spring is so mounted that a low center of gravity for the vehicle results. As is well known, a transverse spring-equipt car is much less expensive than one having longitudinal springs because only two of the former springs are required on each car whereas four of the latter are needed. The purpose of this invention is, therefore, to combine the advantages of the transverse spring with the lower center of gravity obtainable with longitudinal springs.

Transverse springs have in all cases with which the applicant is familiar been mounted above the adjacent axle, the outer ends of the spring being secured to the axle while the center portion of the spring is placed directly above the center portion of the axle. When this construction is applied to a rear axle with its ring gear housing, the top of the spring is considerably above the top of the housing. The center portion of such a spring is usually 4 or 5 inches in thickness so that it will be seen that the bottom of the vehicle must be placed at least 4 or 5 inches above the top of the ring gear housing when the springs are compressed to their greatest extent. With longitudinal springs the bottom of the vehicle may just clear this housing under these conditions so that a longitudinal spring-equipt car may be lowered the thickness of the rear spring under that obtainable with transverse springs.

I have overcome the extra height disadvantage required by the transverse spring structure by placing the spring rearwardly of the ring gear housing so that the body portion of the car may be lowered 4 or 5 inches to thereby correspondingly lower the center of gravity of the car. If a conventional transverse spring is mounted in the rear of the axle the outer ends of the spring must be anchored to arms projecting rearwardly from the axle. Consequently, when a load is applied to the car the stresses on these arms tend to rotate the axle and induce an extremely high bending stress in the radius rods.

The purpose of this invention is to so shape the rear spring that its center portion will clear the ring gear housing while its ends will be close to the axle tube to thereby reduce the torque load on the axle and thus require radius rods no larger than required to resist the fore and aft movement occasioned with the conventional transverse spring mounting.

With these and other objects in view, my invention consists in the arrangement, construction and combination of the various parts of my improved device, as described in the specification, claimed in my claims and illustrated in the accompanying drawings, in which:

Figure 2 shows a vertical central sectional view through that portion of the vehicle shown in Figure 1.

Figure 4 shows a sectional view, taken on the line 4—4 of Figure 3, and

Figure 1:
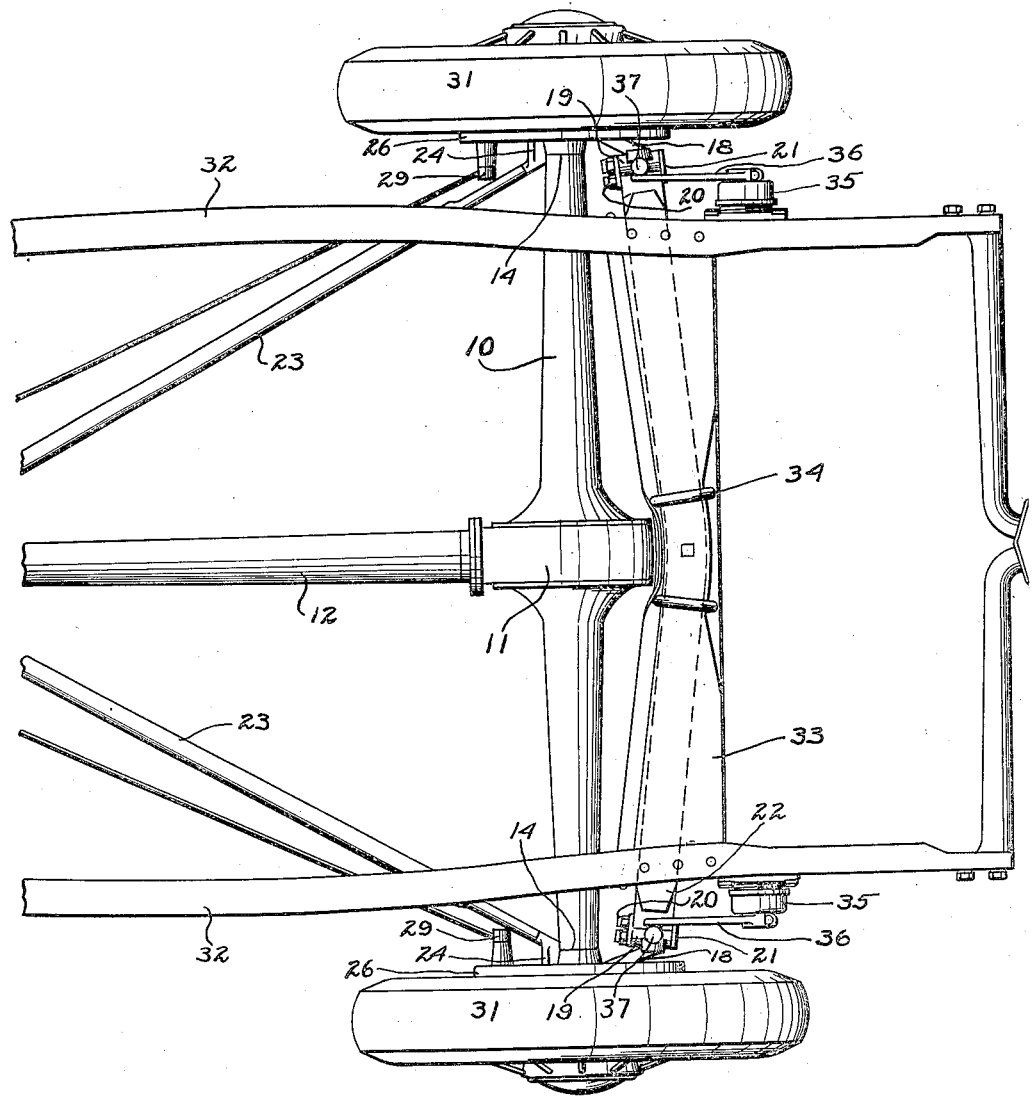
Figure 1 shows a plan view of the rear portion of a vehicle chassis constructed according to my invention.

Referring to the accompanying drawings, I have used the reference numeral 10 to indicate the rear axle of a vehicle, which axle consists of a pair of tubular axle housings projecting from either side of a central gear housing 11, the housing 11 having a torque tube 12 extending forwardly therefrom. Permanently welded at 14 to the outer ends of the axle housing 10 is a bearing sleeve 13 having a radial flange 15 extending from its intermediate portion, and a wheel hub 16 is rotatively mounted upon the outer end of each of these sleeves. The outer end of each hub 16 is keyed to an axle shaft 17 which extends inwardly through the sleeve 13 and into the gear housing 11 in the conventional manner. It will be noted from Figures 3 and 4 that an arm 18 is forged integrally with the inner end of the flange 15 and extends radially therefrom to a position spaced rearwardly from the axle. An eye 19 is drilled through the outer end of the arm 18 in which a shackle bolt 20 is pivotally mounted so as to secure a spring shackle assembly 21 to the arm 18.

Suspended between each of the spring shackles 21, I have provided a transverse spring 22, this spring being composed of a plurality of leaves of graduated lengths, as in the ordinary spring. The unusual feature of this spring is that each spring leaf is bent edgewise so that the center portion of the spring is offset from the ends. Thus, even though the arms 18 extend only a short distance rearwardly from the axle 10, still the center portion of this spring adequately clears the rear of the gear housing 11 so that the spring when flexed downwardly does not interfere with the gear housing. Consequently, the torque load upon the axle housing is considerably less than would result if the conventional transverse spring were used in place of my improved construction.

Even with the short arms 18 some torque is impressed upon the axle housing and in order to overcome this torque a pair of radius rods 23 are provided which extend from the forward end of the torque tube 12 rearwardly and outwardly to each sleeve 13. The rear ends of each radius rod are secured to plates 24 which co-act with the inner face of the respective flanges 15 and bolts 25 extend through both the flanges and the plates to thereby securely fasten the radius rods to the outer ends of the axle housing. The torque of the axle is thus taken through these radius rods.

Figure 3:
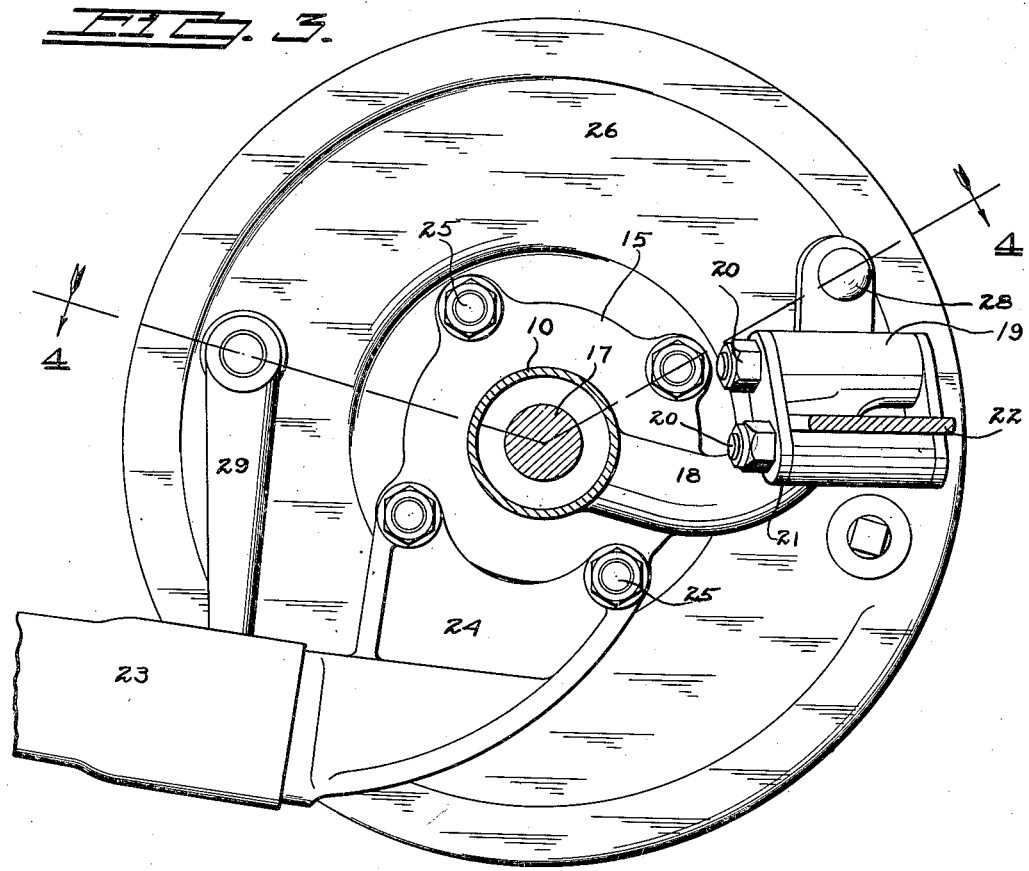
Figure 3 shows a plan view of one of my brake anchor plates, illustrating the construction used.
Figure 5:
Figure 5 shows a perspective view of my rear vehicle spring.

It will be noted from Figure 3 that a brake anchor plate 26 is bolted to each flange 15 by the pair of bolts 25 and a second pair of similar bolts so that the torque produced by the application of the brakes will be absorbed by the radius rods 23. A more or less conventional brake structure is provided, consisting of a pair of brake shoes 27 which are actuated by a lever 29 rotatively mounted upon the anchor plate 26. The brakes 27 co-act with a brake drum 30 which is secured to the wheel hub 16 so that wheels 31 mounted upon the hubs 16 may be stopped thereby.

The frame of my vehicle consists of a pair of side frame members 32 having a rear cross member 33 of channel section extending between the frame side members just rearwardly of the axle unit 11. The center of the spring 22 is secured to the center portion of the cross member 33 by a pair of U bolts 34, whereby the rear portion of the frame member is fixedly secured on the rear spring. Just rearwardly of the cross member 33 a pair of shock absorber units 35 are secured to the frame side members each of which shock absorbers are provided with a conventional operating arm 36 which is connected to a ball 28, formed on the upper end of the arms 18, by a suitable link 37. It may be well to mention that the ball 28 is formed integrally with the end of each arm 18 just above the eye 19 so that the checking of the rebound of the spring is not transmitted through the axle but is resisted directly from the spring shackle bolts to the shock absorbers.

Referring to Figure 2, it will be noted that the rear portion of the frame side members 32 are bowed upwardly so that clearance, shown by dotted line 39, is provided between each frame member and the top of the axle housing 10. The upper edges of the frame members define the normal floor line of the vehicle and a rear seat, shown by dotted lines 40, is mounted upon the frame so that the bottom of the seat is spaced above the top of the axle housing 11 a distance substantially equal to the distance 39. It will thus be seen that with this construction the bottom of the rear seat may be placed as low as possible with a given axle housing and that the use of my transverse spring does not result in the addition of any extra height to the vehicle. Thus, one of the chief objections to the use of transverse springs in automobiles is eliminated.

Among the many advantages derived from the use of my improved device, it may be well to mention that I have provided a vehicle construction in which an inexpensive transverse rear spring is used while at the same time I have so mounted the spring that the center of gravity of the vehicle is materially lowered over the usual type of transverse spring construction. Further, my improved transverse spring is so formed that the torque on the axle housing, due to the load of the vehicle, is no greater than that ordinarily resisted by the radius rods from the normal braking reaction on the axle. Still further, an advantage is believed to reside in my unitary spring perch, axle, shock absorber anchor and bearing sleeve construction so that long life will result therefrom.

Some changes may be made in the arrangement construction and combination of the various parts of my improved device without departing from the spirit of my invention and it is my intention to cover by my claims such changes as may be reasonably included within the scope thereof.

I claim as my invention:

1. A vehicle chassis construction comprising, a frame, a rear axle housing, bearing sleeves secured to the respective ends of said housing, said sleeves each having a radial flange formed on the housing end thereof with the peripheries of the flanges each having a plurality of bolt-receiving openings extending therethrough, a brake anchor plate and brake member rigidly secured to each of said flanges, a torque tube extending from said axle housing to said frame which resists the torsional reaction resulting from the application of said brakes, an arm formed integrally with each of said sleeves which arms extend radially to positions spaced a substantial distance rearwardly from said sleeves, said arms each having an eye formed in its rearmost end, and a transverse vehicle spring having its ends secured to said eyes with its intermediate portion secured to said frame, so that the normal weight of the vehicle will produce a torsional load on said axle housing in a direction opposite to the torsional load resulting from the application of the brakes when the vehicle is travelling in a forward direction.

2. A chassis, as claimed in claim 1, wherein said axle housing had an enlarged ring gear receiving portion at its center, and wherein said spring has its intermediate portion bowed rearwardly sufficiently to clear said enlarged portion upon vertical flexing of said spring.

HENRY FORD.